(12) United States Patent
Posin

(10) Patent No.: US 12,138,534 B2
(45) Date of Patent: *Nov. 12, 2024

(54) BROWSER-BASED CLOUD GAMING

(71) Applicant: Sony Interactive Entertainment LLC, San Mateo, CA (US)

(72) Inventor: David Posin, Corona, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,037

(22) Filed: Apr. 1, 2022

(65) Prior Publication Data
US 2022/0226725 A1    Jul. 21, 2022

Related U.S. Application Data

(63) Continuation of application No. 16/432,608, filed on Jun. 5, 2019, now Pat. No. 11,298,614, which is a
(Continued)

(51) Int. Cl.
*A63F 13/35* (2014.01)
*A63F 13/21* (2014.01)
*A63F 13/2145* (2014.01)
*A63F 13/31* (2014.01)
*A63F 13/335* (2014.01)
*A63F 13/34* (2014.01)
(Continued)

(52) U.S. Cl.
CPC .............. *A63F 13/35* (2014.09); *A63F 13/21* (2014.09); *A63F 13/2145* (2014.09); *A63F 13/31* (2014.09); *A63F 13/335* (2014.09); *A63F 13/34* (2014.09); *A63F 13/352* (2014.09); *A63F 13/355* (2014.09); *A63F 13/71* (2014.09)

(58) Field of Classification Search
None
See application file for complete search history.

(56) References Cited

U.S. PATENT DOCUMENTS

2006/0097453 A1* 5/2006 Feldman ................. A63F 13/22
                                                              273/304
2008/0045338 A1* 2/2008 Walker .................... A63F 13/12
                                                               463/40
(Continued)

*Primary Examiner* — Jay Trent Liddle
(74) *Attorney, Agent, or Firm* — Penilla IP, APC

(57) ABSTRACT

A method is provided, including: executing a session of the cloud video game; establishing, over a network, a connection between a streaming server and a remote client, the connection being established in accordance with a WebRTC protocol; transmitting gameplay video generated from the executing session, encoded in a compressed format, and wherein the gameplay video is presented on a display by the client, wherein the streaming server is configured to receive input data from the client over a data channel established using an RTCDataChannel API; wherein executing the session of the cloud video game includes applying the input data to the session of the cloud video game, to drive real-time gameplay of the session of the cloud video game through the client; wherein the streaming server monitors a condition of the connection and adjusts the encoding of the gameplay video based on the condition of the connection.

20 Claims, 10 Drawing Sheets

Related U.S. Application Data continuation of application No. 16/102,535, filed on Aug. 13, 2018, now Pat. No. 11,130,054, which is a continuation of application No. 15/189,520, filed on Jun. 22, 2016, now Pat. No. 10,046,236.

(60) Provisional application No. 62/349,585, filed on Jun. 13, 2016.

(51) Int. Cl.
*A63F 13/352* (2014.01)
*A63F 13/355* (2014.01)
*A63F 13/71* (2014.01)

(56) References Cited

U.S. PATENT DOCUMENTS

| | | | | |
|---|---|---|---|---|
| 2010/0306813 | A1* | 12/2010 | Perry | H04L 67/131 |
| | | | | 725/114 |
| 2013/0162680 | A1* | 6/2013 | Perry | G09G 5/003 |
| | | | | 345/634 |
| 2015/0127774 | A1* | 5/2015 | Hitomi | H04L 65/60 |
| | | | | 709/219 |
| 2015/0174478 | A1* | 6/2015 | Barak | A63F 13/795 |
| | | | | 463/31 |
| 2016/0077603 | A1* | 3/2016 | Rinfret | G06F 9/452 |
| | | | | 345/156 |
| 2016/0192029 | A1* | 6/2016 | Bergstrom | H04L 65/80 |
| | | | | 709/219 |
| 2016/0380967 | A1* | 12/2016 | Moore | H04L 61/2589 |
| | | | | 709/217 |

\* cited by examiner

BROWSER-BASED CLOUD GAMING

CLAIM OF PRIORITY

This application claims priority to U.S. Non-provisional application Ser. No. 16/432,608, filed Jun. 5, 2019, entitled: "BROWSER-BASED CLOUD GAMING," which claims priority to U.S. Non-provisional application Ser. No. 16/102,535, filed Aug. 13, 2018 (U.S. Pat. No. 11,130,054, issued on Sep. 28, 2021), entitled "BROWSER-BASED CLOUD GAMING," which claims priority to U.S. Non-provisional application Ser. No. 15/189,520, filed Jun. 22, 2016 (U.S. Pat. No. 10,046,236, issued on Aug. 14, 2018), entitled "BROWSER-BASED CLOUD GAMING," which claims priority to U.S. Provisional Application No. 62/349,585, filed Jun. 13, 2016, entitled "BROWSER-BASED CLOUD GAMING." The disclosures of these applications are incorporated by reference herein.

FIELD OF THE DISCLOSURE

The present disclosure relates to systems and methods for browser-based cloud gaming, and more specifically to establishment of a peer-to-peer connection between a web client application and a streaming server, and use of the streaming server to handle decryption of an encrypted video stream from a cloud game machine that executes a video game.

BACKGROUND

DESCRIPTION OF THE RELATED ART

A current area of rapidly growing technology is the field of cloud gaming. Users are able to access a number of games on a cloud gaming site over a network, such as the Internet, and begin interaction/playing the game. In order to select a game for game play, a user accesses his/her account on the cloud gaming site, and initiates one of a plurality of games that are available to the user account for game play. The video generated from the cloud video game is transported to a client device. One example of a cloud gaming system is the Playstation® Now cloud gaming service.

It is within this context that embodiments of the disclosure arise.

SUMMARY OF THE DISCLOSURE

Implementations of the present disclosure provide methods and systems that are used to provide browser-based cloud gaming.

Broadly speaking, implementations of the present disclosure are drawn to a gaming client inside modern web browsers. The browser client can be built using WebRTC technology, which is a well-supported technology that functions similarly over all the major browsers. WebRTC differs from TCP transport in that error checking or packet guarantees are not performed. Similar to a UDP transport, WebRTC is fast by sending/receiving packets with little/no overhead.

Implementations of the present disclosure use WebRTC to create a peer-to-peer connection which is a direct connection between two clients. The peer-to-peer connection allows the connection to avoid multiple hops and impact latency. Connection initiation is performed using Session Description Protocol (SDP). SDP is used to create a communication contract between two devices, and supports several options for the control of buffering, key frame definitions, fallback ports, protocols, etc.

The browser client can be supported by a Node.js server. Node servers are highly performant with very little overhead. The Node server communicates directly with the console. The server accepts the current data stream as is, and decryption of the stream occurs on the server side. As the power and performance of the server can be controlled, minimal reliance is placed on user machines which can widely vary in capability.

The decrypted stream can be compressed with standard web technology that all browsers can support. The server creates a secure session with the browser which consumes the stream using WebRTC. In some implementations, the video connection may be through a video streaming server, such as a VLAN streaming server. In some implementations, it is beneficial to have a separate streaming server sending the video and audio stream in tandem with the Node server.

A WebRTC data channel can also be initiated between the server and browser. The data channel is used to send commands back to the executing video game. An input device (e.g. controller, keyboard, mouse, touchscreen, etc.) can be used. The command produced by the input device is sent via the data channel to the Node server. The Node server then sends the correct command to the console.

Accordingly, a fast connection with minimal latency is established which provides a solid gaming experience. Using WebRTC for cross-browser speedy streaming, the Node server for heavy data operations, and the data channel to communicate back to the console via the server, it is possible to create a satisfying gaming experience. Using the Node.js server as a communication medium between the console in the game machine and the browser creates a lightweight proxy for the client, which creates minimal latency in data transmission but a potentially great savings in processing time. WebRTC is used to create a peer-to-peer connection.

In accordance with some implementations, a method is provided, including the following method operations: receiving, over a network from a browser executed by a client device, a request to initiate gameplay of a cloud video game; responsive to receiving the request, transmitting over the network to the client device a web application configured for execution by the browser of the client device, and initiating execution of the cloud video game by a cloud game machine to generate a first video stream including video content of the cloud video game that is encoded in a compressed video format and encrypted using an encryption scheme; transmitting the first video stream from the cloud game machine to a streaming server; decrypting the first video stream by the streaming server to generate encoded video content; transmitting, by the streaming server, the encoded video content over the network using a secure protocol to the web application, the transmitting of the encoded video content defining a second video stream, the web application being configured to receive and process the second video stream to provide the video content of the cloud video game for rendering to a display.

In some implementations, the web application, when executed by the browser of the client device, is configured to establish a peer-to-peer connection over the network with the streaming server; wherein transmitting the second video stream to the web application occurs over the peer-to-peer connection.

In some implementations, the method further includes: receiving over the peer-to-peer connection, by the streaming server from the web application, input data processed by the web application from interactive input received at the client device from one or more client input devices during the rendering of the video content by the web application to the display; processing the input data by the streaming server to generate commands for the cloud video game, and sending the commands from the streaming server to the cloud game machine to be applied to a current game state of the cloud video game to determine a future game state of the cloud video game.

In some implementations, the one or more client input devices are selected from the group consisting of a keyboard, a mouse, a touchpad, a touch-sensitive display, a game controller, or a motion controller.

In some implementations, the method further includes: identifying, by the streaming server, a type of the browser of the client device; responsive to identifying the type of the browser, transcoding the encoded video content to a second compressed video format, wherein transmitting the second video stream includes transmitting the transcoded video content.

In some implementations, the second compressed video format is selected based on the identified type of the browser, the second compressed video format being a video format that is supported by the browser.

In some implementations, the web application accesses a WebRTC Web API.

In some implementations, the streaming server is a Node.js server.

In some implementations, the game machine is one of a game console, a game console blade or hardware board, or a server computer configured to execute a virtual game console.

In some implementations, the secure protocol is a Hypertext Transfer Protocol Secure (HTTPS) protocol.

In some implementations, the operations of generating the first video stream, transmitting the first video stream, decrypting the first video stream, and transmitting the encoded video content, are performed in substantial real-time so as to enable real-time interactive gameplay of the cloud video game through the browser of the client device.

In some implementations, the video content of the cloud video game defines a view of a virtual environment.

In accordance with some implementations, a method is provided, including the following method operations: receiving, over a network from a client device, a request to initiate gameplay of a cloud video game; responsive to receiving the request, initiating execution of the cloud video game by a cloud game machine to generate a first video stream including video content of the cloud video game that is encoded in a compressed video format and encrypted using an encryption scheme; responsive to identifying the request as originating from a browser executed by the client device, then, transmitting over the network to the client device a web application configured for execution by the browser of the client device, transmitting the first video stream from the cloud game machine to a streaming server, decrypting the first video stream by the streaming server to generate encoded video content, and, transmitting, by the streaming server, the encoded video content over the network using a secure protocol to the web application, the transmitting of the encoded video content defining a second video stream, the web application being configured to receive and process the second video stream to provide the video content of the cloud video game for rendering to a display; responsive to identifying the request as originating from a game console that defines the client device, then, transmitting the first video stream over the network to the game console for rendering to a display.

In some implementations, the web application, when executed by the browser of the client device, is configured to establish a peer-to-peer connection over the network with the streaming server; wherein transmitting the second video stream to the web application occurs over the peer-to-peer connection.

In some implementations, further responsive to the identifying the request as originating from the browser, receiving over the peer-to-peer connection, by the streaming server from the web application, input data processed by the web application from interactive input received at the client device from one or more client input devices during the rendering of the video content by the web application to the display; processing the input data by the streaming server to generate commands for the cloud video game, and sending the commands from the streaming server to the cloud game machine to be applied to a current game state of the cloud video game to determine a future game state of the cloud video game.

In some implementations, further responsive to the identifying the request as originating from the browser, identifying, by the streaming server, a type of the browser of the client device; responsive to identifying the type of the browser, transcoding the encoded video content to a second compressed video format, wherein transmitting the second video stream includes transmitting the transcoded video content.

In some implementations, wherein the second compressed video format is selected based on the identified type of the browser, the second compressed video format being a video format that is supported by the browser.

In some implementations, wherein the web application accesses a WebRTC Web API.

In some implementations, wherein the streaming server is a Node.js server.

In some implementations, the game machine is one of a game console, a game console blade or hardware board, or a server computer configured to execute a virtual game console.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Figure 1A:
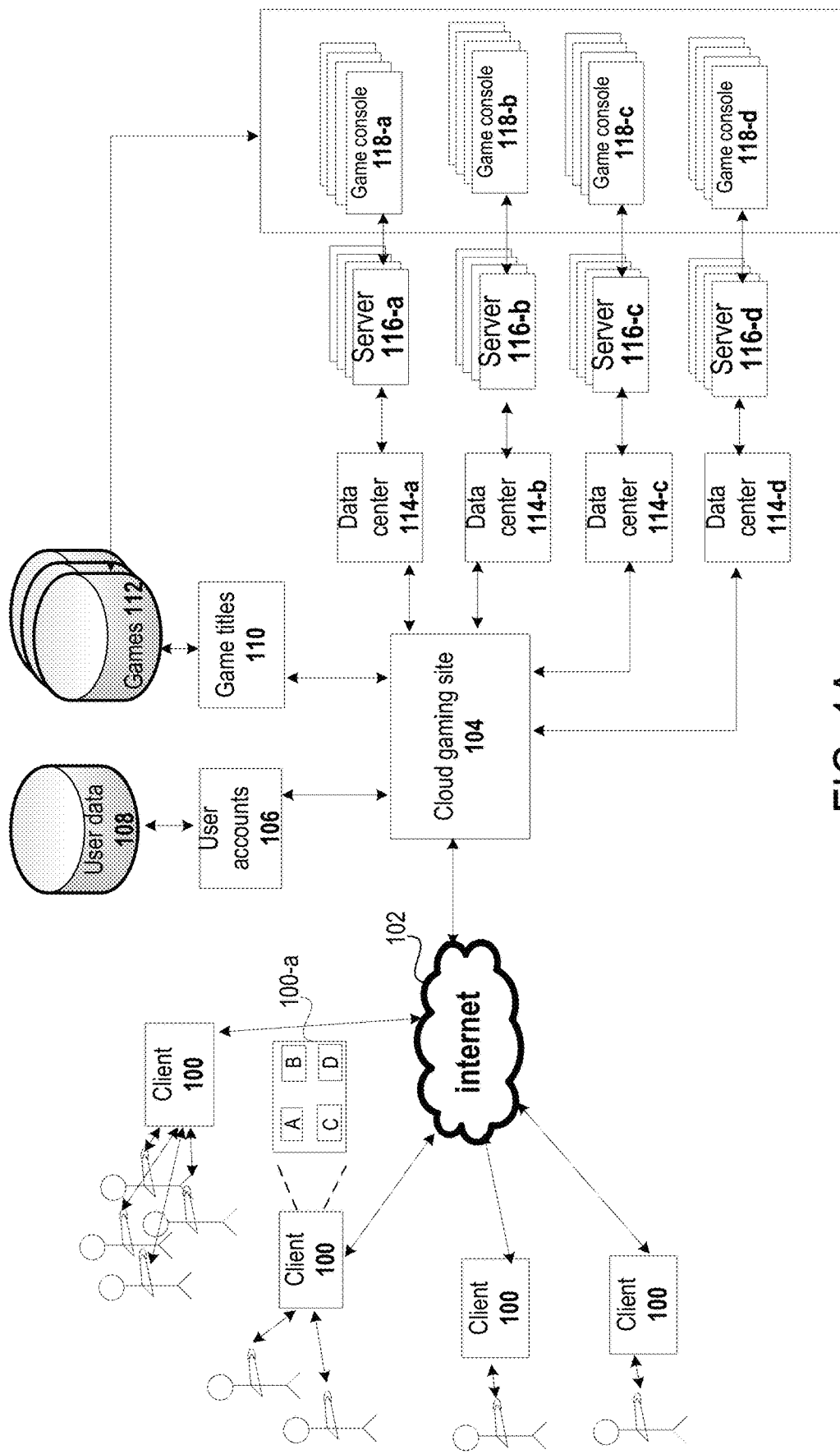
FIG. 1A illustrates a simplified block diagram of an exemplary system that is used to preload game content onto a cloud game server, in accordance with an embodiment of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

One example of a cloud gaming system is the Playstation® Now cloud gaming service. At present, in such a system, the client device is a game console, such as a Playstation® 4 game console. Because the resources of a game console are standardized and known, the streaming of gameplay video from the cloud-executed video game to the game console can be optimized to provide a satisfactory experience. For example, the client application that is executed by the game console can be developed specifically for the cloud gaming service in view of the resources of the game console.

However, a game console is a proprietary hardware device, and therefore a more universally available mechanism for providing access to a cloud gaming service is sought. One solution is to implement a game client on a web browser. However, there are several different web browsers and any number of different client devices having various resource configurations. It is not possible to guarantee the resources of the client device and thus it is problematic to provide consistent game streaming of satisfactory quality when substantial reliance is placed on the resources of the client device. For this reason, existing cloud gaming setups can require a specific client device coupled with proprietary software.

In an existing cloud gaming system (e.g. Playstation® Now), a cloud game machine (e.g. a cloud console device) exists in a data center, and a server sets up a connection between a client device (e.g. Playstation® 4 game console) and the cloud game machine. Then the streaming is directly between the cloud game machine and the client, which provides fast connections allowing for sufficient performance to be a viable service. However, when a web browser requests content from a server, and when streaming from the server to the web browser using conventional systems, the performance can be insufficient for cloud gaming due to too many hops existing between the client device and the cloud game machine, and possible insufficiencies of the client device's resources.

Thus, implementations in accordance with the present disclosure provide a system in which a peer-to-peer connection is established between a web browser at a client device and a streaming server. The streaming server is typically installed local to the cloud game machine to minimize latency, and handles decryption of a video stream received from a cloud game machine, thereby reducing reliance on client device resources. It will be appreciated that in such a system, the cloud game machine can be configured to stream to a dedicated game client device (such as a game console), or to the streaming server which then streams to a web client that is instantiated as a web application executed by a web browser at a client device. Thus, the provided system is flexible in accommodating both dedicated client devices and web browser-based clients.

In some implementations, the web application and peer-to-peer connection with the streaming server are implemented using WebRTC technologies. In some implementations, the streaming server is implemented as a Node.js server, and can be configured to publish in UDP for optimal streaming performance. Conventionally, browsers use TCP/IP, which is a serial process such that if a packet is lost, then the connection is broken. However, UDP allows packets to be dropped without breaking connection, which is advantageous for streaming video.

Thus, implementations in accordance with the present disclosure provide a web client that leverages peer-to-peer technology (e.g. using WebRTC protocols) to reduce or eliminate intermediary connections, and uses UDP to optimize streaming performance. The streaming server acts as a dedicated client device with respect to the cloud game machine, accepting a video stream from the cloud game machine and decrypting it. In some implementations, the streaming server uses Hypertext Transfer Protocol Secure (HTTPS) which is a secure protocol to transmit the video content to the browser-based client.

Thus, implementations in accordance with the present disclosure provide solutions to the problem of enabling satisfactory streaming gameplay of a video game through a web browser on a client device whose resource capabilities cannot be guaranteed, without requiring the installation of proprietary software on the client device. The streaming server outputs a video stream that the browser can accept and render without significantly impacting performance.

Several operations are performed by a server(s) within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to a user. Game data associated with a game includes generic game data and user-specific game data. Therefore, initializing the files includes identifying, loading, and initializing generic game data and user-specific game data. Initializing generic game data may include initializing a graphics engine, installing graphics data, initializing sound files, installing art work, etc. Initializing user specific data may include locating, transferring, and installing user data, user history, game history, etc. Loading of the generic game data and/or user specific data may take anywhere from a few seconds to a few minutes depending on the complexity of the game/graphics of the game.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, the audio content may be rendered and a selection/navigation screen is presented for user selection/customization. User selection input provided at the selection/navigation screen may include game level selection, game icon(s) selection, game mode selection, game winnings, other user-related data that may require uploading of additional game content. Uploading of user selection input can cause additional delay before the game content is made available to the user for game play. In some embodiments, game content is made available by streaming the game content from the game cloud system to a user's computing device for viewing and interacting. After loading user specific data, the game content is available for game play.

FIG. 1A illustrates an exemplary system used to load game files for a game available through a cloud gaming site. The system includes a plurality of client devices 100 that are communicatively connected to the cloud gaming site 104 over a network 102, such as the Internet. When a request to access the cloud gaming site 104 is received from a client device 100, the cloud gaming site 104 accesses user account information 106 stored in a user data store 108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 110 to identify the game titles that are available at the game cloud site for the user account initiating the request. The game titles data store 110, in turn, interacts with a games database 112 to obtain the game titles for all the games that are available for the cloud gaming site. As new games are introduced, the games database 112 will be updated with the game code and the game titles data store 110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 100-*a*, as shown in FIG. 1A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 1B:
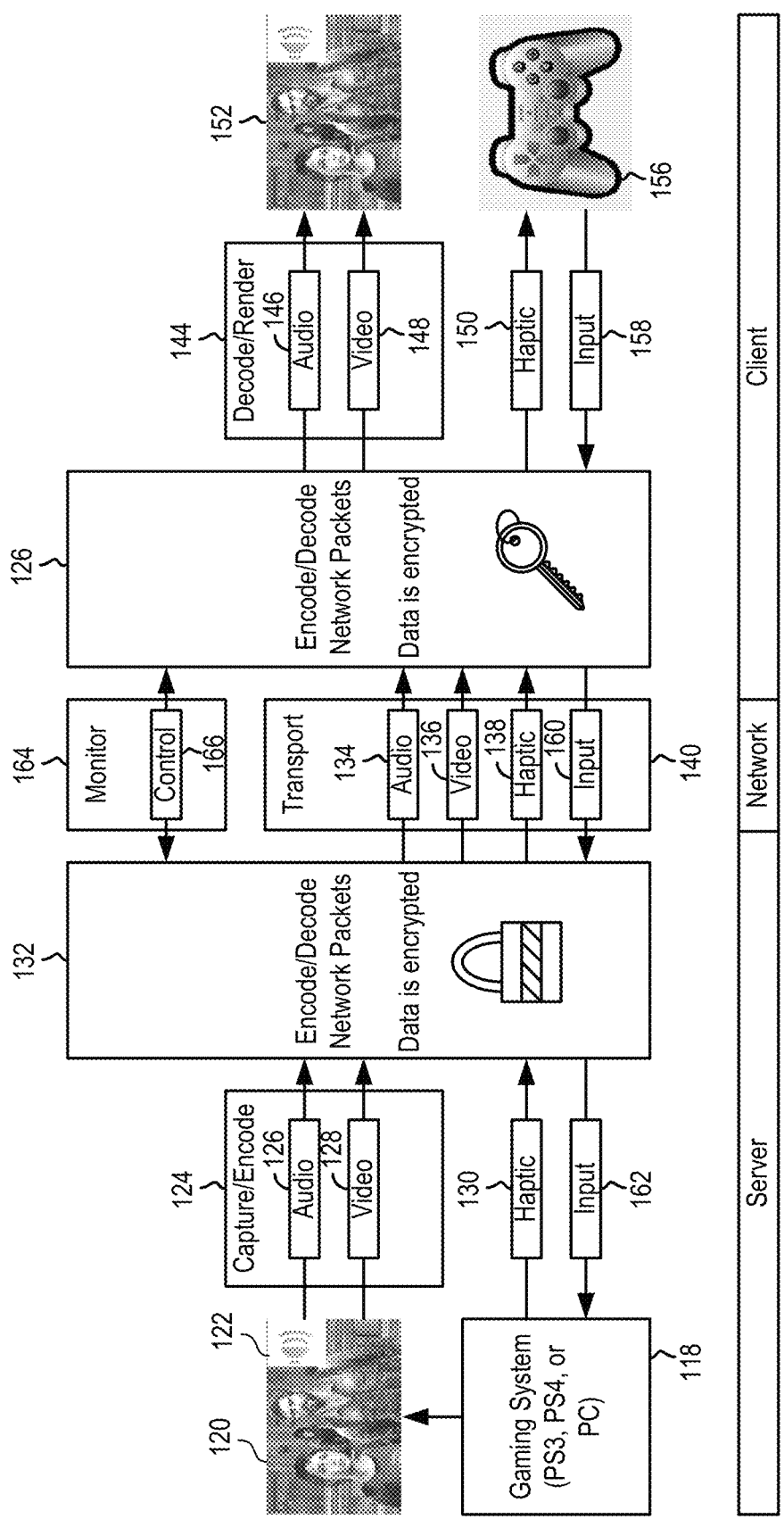
FIG. 1B is a flow diagram conceptually illustrating various operations which are performed for streaming a cloud video game to a client device, in accordance with implementations of the disclosure.

FIG. 1B is a flow diagram conceptually illustrating various operations which are performed for streaming a cloud video game to a client device, in accordance with implementations of the disclosure. The gaming system 118 executes a video game and generates raw (uncompressed) video 120 and audio 122. The video 120 and audio 122 are captured and encoded for streaming purposes, as indicated at reference 124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 126 and encoded video 128 are further packetized into network packets, as indicated at reference numeral 132, for purposes of transmission over a network such as the Internet. The network packet encoding process can also employ a data encryption process, thereby providing enhanced data security. In the illustrated implementation, audio packets 134 and video packets 136 are generated for transport over the network, as indicated at reference 140.

The gaming system 118 additionally generates haptic feedback data 130, which is also packetized into network packets for network transmission. In the illustrated implementation, haptic feedback packets 138 are generated for transport over the network, as further indicated at reference 140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 140, the audio, video, and haptic feedback packets are transported over a network, such as and/or including the Internet. As indicated at reference 142, the audio packets 134, video packets 136, and haptic feedback packets 138, are decoded/reassembled by the client device to define encoded audio 146, encoded video 148, and haptic feedback data 150 at the client device. If the data has been encrypted, then the network packets are also decrypted. The encoded audio 146 and encoded video 148 are then decoded by the client device, as indicated at reference 144, to generate client-side raw audio and video data for rendering on a display device 152. The haptic feedback data 150 can be processed/communicated to produce a haptic feedback effect at a controller device 156 or other interface device through which haptic effects can be rendered. One example of a haptic effect is a vibration or rumble of the controller device 156.

It will be appreciated that a video game is responsive to user inputs, and thus, a similar procedural flow to that described above for transmission and processing of user input, but in the reverse direction from client device to server, can be performed. As shown, a user operating controller device 156 may generate input data 158. This input data 158 is packetized at the client device for transport over the network to the cloud gaming system. The input data packets 160 are unpacked and reassembled by the cloud gaming server to define input data 162 on the server-side. The input data 162 is fed to the gaming system 118, which processes the input data 162 to update the game state of the video game.

During transport (ref. 140) of the audio packets 134, video packets 136, and haptic feedback packets 138, the transmission of data over the network can be monitored to ensure the cloud game stream quality of service. For example, network conditions can be monitored as indicated by reference 164, including both upstream and downstream network bandwidth, and the game streaming can be adjusted in response to changes in available bandwidth. That is, the encoding and decoding of network packets can be controlled based on present network conditions, as indicated by reference 166.

Figure 2:
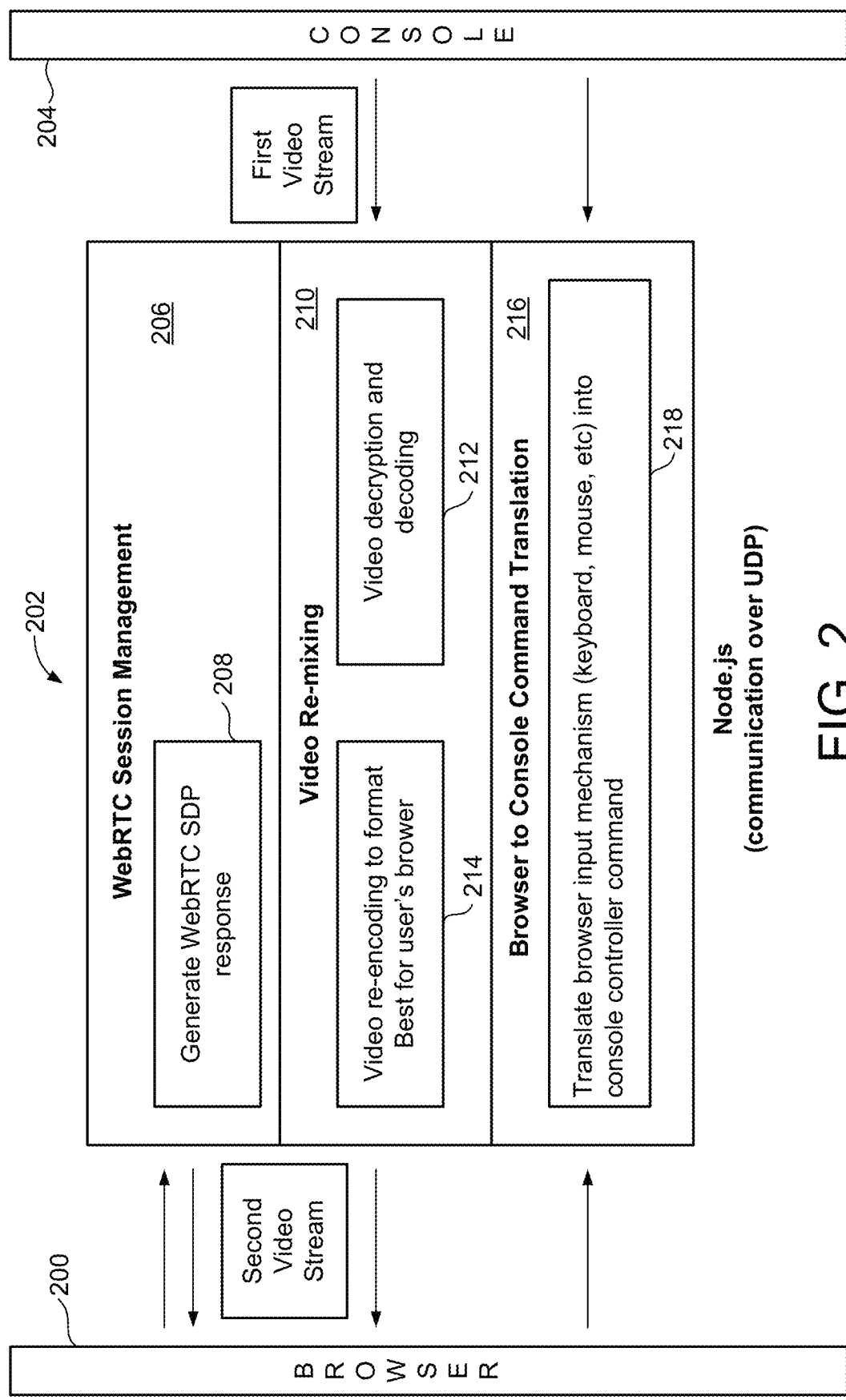
FIG. 2 conceptually illustrates a process for establishing and handling communications amongst a web browser, a streaming server, and a cloud console for purposes of cloud gaming, in accordance with implementations of the disclosure.

FIG. 2 conceptually illustrates a process for establishing and handling communications amongst a web browser, a streaming server, and a cloud console for purposes of cloud gaming, in accordance with implementations of the disclosure. In the illustrated implementation, the web browser 200 has been used to access a cloud gaming service, and the user now wishes to initiate gameplay of a cloud video game. The web browser has received a web application that is configured to be executed in the web browser, and in some implementations, accesses a WebRTC API supported by the browser. As the web application is executed by the web browser, for purposes of ease of description of the present implementation, the terms "web browser" and "web application" will be used interchangeably when describing their use for gameplay of the cloud video game.

A peer-to-peer connection is established between the web browser 200 and a streaming server 202. In some implementations, the peer-to-peer connection is established using the RTCPeerConnection API, and furthermore in accordance with Session Description Protocol (SDP). Broadly speaking, this entails signaling to exchange media configuration information by exchanging an offer and an answer using SDP. In the illustrated implementation, the web browser 200 initiates the offer to the streaming server 202, and the streaming server 202 uses a Session Management module 206 to generate an answer in response, indicated at ref. 208. This establishes a peer-to-peer connection between the web browser 200 and the streaming server 202, which provides for low latency to enable optimal streaming video performance.

The requested cloud video game is executed by the cloud console 204, which executes the video game and generates video data that is both encoded in a specific video format and encrypted using an encryption scheme, defining a first video stream. In a situation wherein the client device is a dedicated client gaming device such as a game console, this first video stream can be directly transmitted to the dedicated client gaming device, which is configured to decrypt and decode the first video stream. However, in the present implementation, as the client is a web browser operating on a client device whose resources may not be guaranteed to provide satisfactory streaming service, then it is desirable to limit the dependence on the client device's capabilities. Thus, the streaming server 202 includes a Video Re-mixing module 210 that is configured to receive the first video stream and decrypt it (ref. 212). This decrypted video can be transmitted over a secure protocol to the web browser 200 for rendering to a display, thereby defining a second video stream. It will be appreciated that the secure protocol is one in accordance with the peer-to-peer connection established between the streaming server 202 and the web browser 200 (e.g. RTCPeerConnection API). In some implementations, the secure protocol is one implemented by WebRTC, such as SRTP. It will be appreciated that the streaming server 202, and more specifically the Video Re-mixing module 210, removes the encryption that was applied by the cloud console 204, and may apply a different encryption supported by the web browser 200 for the peer-to-peer connection.

Optionally in an alternative implementation, in addition to decrypting the first video stream, the Video Re-mixing module 210 may also be configured to decode the (decrypted) first video stream (ref. 212), and then re-encode the resulting video content (ref. 214) in a video format that is suitable or preferred for the particular type of web browser 200. Examples of web browser types include Internet Explorer, Chrome, Firefox, Safari, etc. The re-encoded video content is transmitted over the secure protocol to the web browser 200, thus defining the second video stream, which has now been transcoded from the first video stream.

The streaming server additionally includes a Command Translation module 216 that can translate input data received via a browser input mechanism (e.g. keyboard, mouse, touchpad, trackball, or any other browser input device) into a console controller command (ref. 218), which will be transmitted to the cloud console 204. In some implementations, the input data received from the browser by the streaming server 202 is transmitted using the RTCDataChannel API. Once received from the streaming server 202, the console controller command is applied by the cloud console 204 to update the state of the executing video game.

Figure 3:
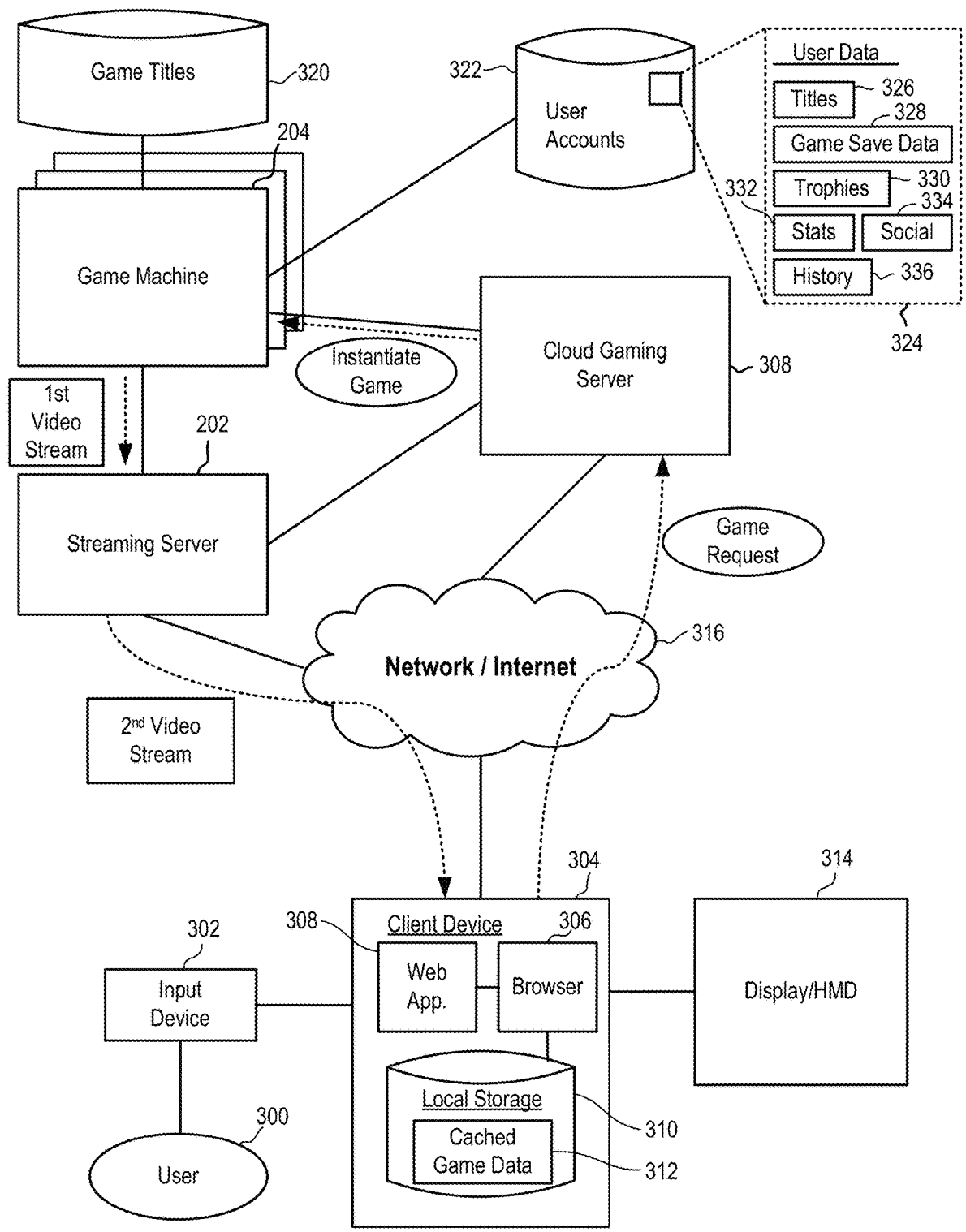
FIG. 3 illustrates a system for cloud gaming, in accordance with implementations of the disclosure. The user 300 interacts with a client device 304 that is configured to access a cloud gaming service.

FIG. 3 illustrates a system for cloud gaming, in accordance with implementations of the disclosure. The user 300 interacts with a client device 304 that is configured to access a cloud gaming service. The user 300 may operate an input device 302 (e.g. mouse, keyboard, controller device, touchpad, trackball, motion controller, touchscreen, etc.) to generate and provide input to the client device 304. Furthermore, the client device 304 can be configured to render content to a display device 314. It will be appreciated that in various implementations, the display device 314 can be a head-mounted display, monitor, LCD/LED display, touchscreen display, television, projector, etc.

The client device communicates over network 316 to a cloud gaming server 318, which provides access to the user's cloud gaming account. The cloud gaming server 318 retrieves user data 324 from a user accounts storage 322, the user data 324 being specific for the user 300 in the illustrated embodiment. By way of example, the user data 324 can include various cloud gaming related data such as titles 326 which are the available game titles for gameplay by the user. These may be game titles which the user has purchased, rented, borrowed, been awarded, or to which the user has otherwise obtained access for gameplay. The user data may also include game save data 328, trophies 330, statistics 332, social data 334 (e.g. including social graph data), and history data 336 (e.g. user access history, gameplay history, etc.).

When the user 300 wishes to play a given cloud video game to which the user has access permission, the user may use a web browser 306 to access a graphical user interface (GUI) from a cloud gaming server 318. The GUI is presented by the client device 304 on the display 314, and the user 300 may indicate selection of the given cloud video game through the GUI. Upon selection of the video game for gameplay, a game request is transmitted from the client device 304 to the cloud gaming server 318. The game request may identify the game title that the user wishes to play. In response to receiving the game request, the cloud gaming server 318 activates a cloud game machine 204 to instantiate the requested video game title. That is, the cloud game machine 204 is assigned to the requesting client device 304, and begins executing the requested video game title.

The game machine 204 obtains the requested game title code from game titles data store 320, and executes the game title code to define the executing video game. The game machine 204 outputs a first video stream that is encrypted and encoded. The first video stream that is output from the game machine 204 is provided to a streaming server 202, which decrypts the first video stream. The resulting encoded video can then be transmitted over network 316 in accordance with a secure network communication protocol to the client device 304, defining a second video stream. The second video stream is processed by a web application 308 that is executed by the browser 306, and rendered to the display 314 for interactive gameplay. The web application 308 is provided to the client device 304 from the cloud gaming server 318, in some implementations, in response to the request to play the cloud video game. In other implementations, the web application 308 may be provided to the client device 304 prior to the request to play the cloud video game. In some implementations, the web application, or a portion thereof, can be cached on the client device 304 in a local storage 310 that is associated with the web browser 306. In such implementations, the web application can, if available, be retrieved from the local storage 310 for execution when gameplay of a given video game is requested. It will be appreciated that the web application 308 is configured to provide for the processing of the second video stream that is received from the streaming server 202 for rendering to the display 314, and also may handle interactive input received from the input device 302 by the client device 304, which is processed for transmission back to the streaming server 202.

As will be appreciated by those skilled in the art, the executing video game may define a game engine which receives input, and processes the input to update the game state of the video game. In some implementations, the game engine of the video game is initialized at the game machine, while initial content is being presented at the client device. The game engine may be initialized and then entered into a paused state, as the game machine awaits a trigger to continue execution of the game engine. Upon receipt of the trigger, which can be defined from a user input, the paused state is exited and the resulting execution of the game engine provides for the initiation of interactive gameplay of the video game. In some implementations, the initialization of the game engine at the game machine can be configured to load the user's last saved game data, as in many cases, a user will typically wish to continue gameplay from their last saved location.

For ease of description, implementations have been described in which the game machine 204 is contemplated as a singular device such as a game console or equivalent hardware (e.g. bladed game console hardware). However, it will be appreciated that in other implementations, the functionality described as being performed by the game machine may be performed by a plurality of devices, such as a combination of a game console (or equivalent hardware) and an additional streaming processor/server. In such an implementation, the game console may perform execution of the video game and render an initial video stream that is unencoded and/or unencrypted, and this initial video stream may then be encoded and/or encrypted by the separate streaming processor/server to generate the aforementioned first video stream that is processed by the streaming server 202 in the illustrated implementation. It will be appreciated that the initial video stream can be transmitted to a dedicated client gaming device as described above, which is capable of decrypting and decoding the initial video stream. However, for purposes of enabling cloud gaming through a web browser with satisfactory performance for the user, the streaming server 202 is utilized as shown. In this manner, the outputted first video stream from the game machine 204 can be used for streaming gameplay to either of a dedicated client gaming device or a web browser executing on a client device.

In some implementations, for a given video game, game data 312 can be cached or stored to the local storage 310. Such content can be stored and/or retrieved for gameplay of the video game. For example, various art assets, audio assets, settings, and other data may be stored as part of the game data.

In various implementations, a client device can be a general purpose computer, a special purpose computer, a portable gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In some implementations, the cloud gaming system is configured to detect the type of client device which is being utilized by the user, and provide a cloud-gaming experience appropriate to the user's client device. For example, image settings, audio settings and other types of settings may be optimized for the user's client device.

Figure 4:
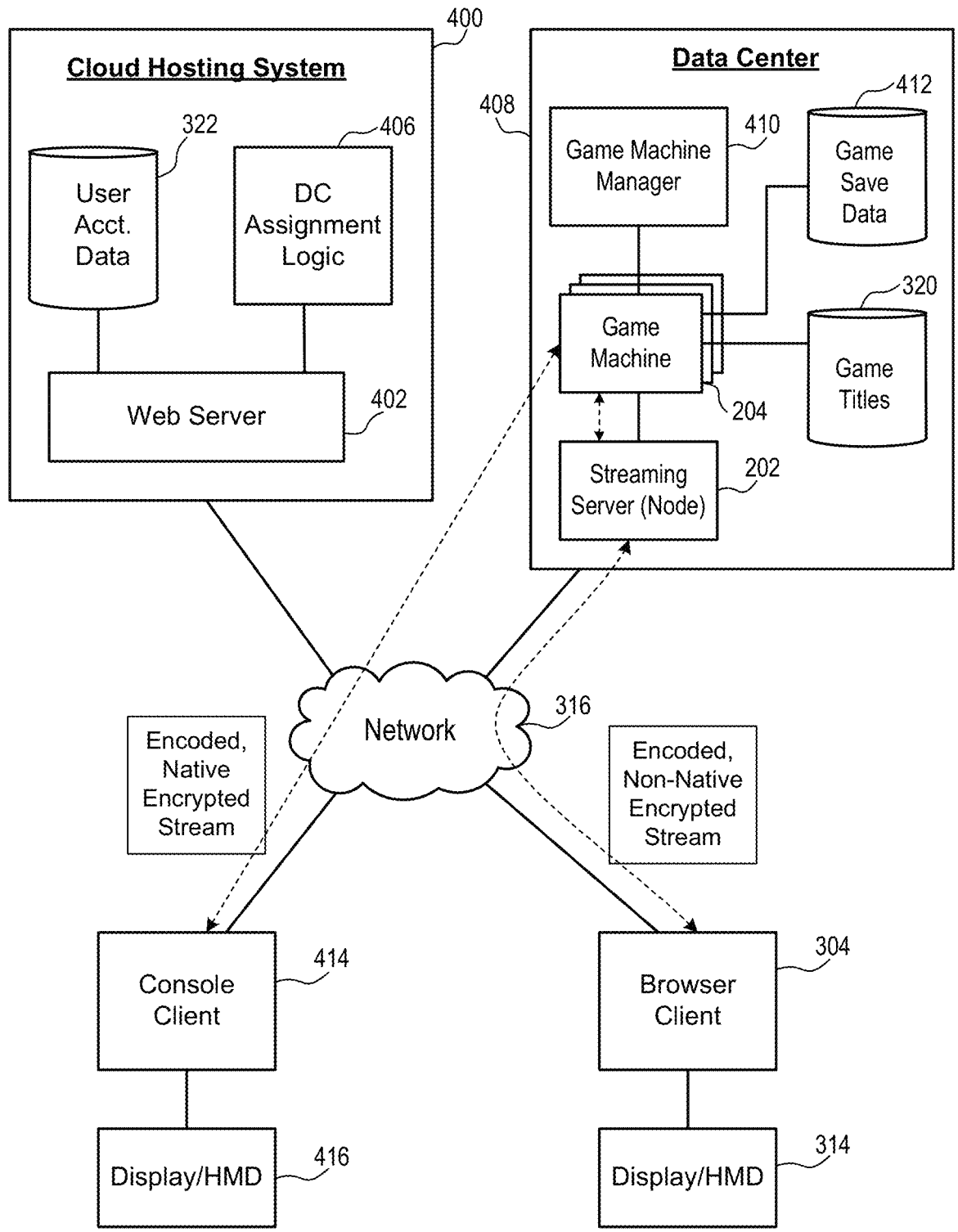
FIG. 4 illustrates a system for providing cloud gaming services, in which a game machine hosted in a data center may service either of a dedicating gaming device client or a browser client device, in accordance with implementations of the disclosure.

FIG. 4 illustrates a system for providing cloud gaming services, in which a game machine hosted in a data center may service either of a dedicating gaming device client or a browser client device, in accordance with implementations of the disclosure. In the illustrated implementation, a cloud hosting system 400 is accessible over the network 316 by client devices to enable the cloud gaming services. Data center assignment logic 406 is configured to assign a given client device to a specific data center, such as data center 408. It will be appreciated that data center assignment logic 406 may assign a given client device to a particular data center based on a variety of factors, including geographic proximity, network proximity, IP address, load balancing across data centers, network latency (e.g. between client device and data center), prior assignment to a given data center, location of user game save data at a given data center, etc. The data center assignment logic 406 may also reassign a given client device to a new data center, for example, if network conditions change and it is determined that better game streaming performance can be obtained by reassigning the client device.

In some implementations, the cloud hosting system 400 manages and provides to client devices a cloud gaming platform interface. The cloud gaming platform interface can be a graphical user interface that enables the user to browse game titles that are available for purchase and/or gameplay, and initiate a request to initiate gameplay of a specific video game. It will be appreciated that the cloud gaming platform interface can be customized depending upon user account data 322 for the specific user that is accessing the cloud gaming system. In addition to selecting or initiating gameplay of video games, the gaming platform interface may provide other features, e.g. access to social network(s), news, media libraries, video content, audio content, image content, user account settings, etc. In some implementations, when a request to initiate gameplay of a video game is received from a given client device, then the client device is assigned to the data center 408 and more specifically, to the specific game machine 204, for streaming gameplay of the video game.

The data center 408 can include a game machine manager 410 that is configured to manage the utilization of the various game machines at the data center including the game machine 204. For example, the assignment of a given client to a specific game machine in the data center 408 may be determined by the game machine manager 410. Further, game machines can be pre-loaded with specific video games based on demand (or anticipated demand) for the video games, so that wait times to initiate gameplay of a video game can be reduced. When a client is assigned to a game machine 204, the game machine 204 may load the user's previously saved gaming data from a game save data storage 412.

As shown in the illustrated implementation, the output from the game machine 204 as it executes the cloud video game can be used to service either of a console client device 414 or a browser client device 304. In the case of the console client device (which as noted above, is a dedicated client gaming device rather than a browser-based client), the output from the game machine 204 is an encrypted and encoded video stream that is transmitted over the network 316 to the console client device 414, for rendering to a display 416, which in some implementations can be an HMD.

However, in the case wherein the client device is a browser client device 304 that executes a browser (e.g. browser 306 shown at FIG. 3) that is utilized to access the cloud gaming system, then the output from the game machine 204 is first provided to a streaming server 202 for decryption and possible transcoding, before being transmitted over the network 316 to the browser client device 304.

In some implementations, the browser of the client device 304 communicates with a web server 402 to access the cloud gaming platform interface, and to initiate gameplay of a requested video game. In accordance with implementations of the disclosure, the first video stream that is generated by the game machine 204 is encoded with a suitable encoding scheme and encrypted with a native encryption scheme, whereas the second video stream that is transmitted from the streaming server 202 to the client device 304 can be encoded as well, but may be encrypted with a different non-native encryption scheme that is in accordance with the secure transmission protocol (e.g. HTTPS) utilized for transmission between the streaming server 202 and the client device 304.

It should be appreciated that the aforementioned console client device is merely one example of a dedicated client device, and in other implementations, it will be appreciated that other types of dedicated client devices may be substituted. A dedicated client device for purposes of the present disclosure is one that is configured to handle decryption of the encrypted video stream that is output from the game machine 204, and typically has been qualified for and installed with proprietary software for this purpose. In addition to game consoles, which are typically special purpose computers running specialized gaming platform software, other types of devices can be configured as dedicated client devices, such as a portable gaming device, a set-top box, smart television, or other device that is configured to perform the functionality of a dedicated client device in accordance with the present disclosure. In contrast to such dedicated client devices, the browser client device 304 does not handle decryption of the video stream from the game machine 204.

Figure 5:
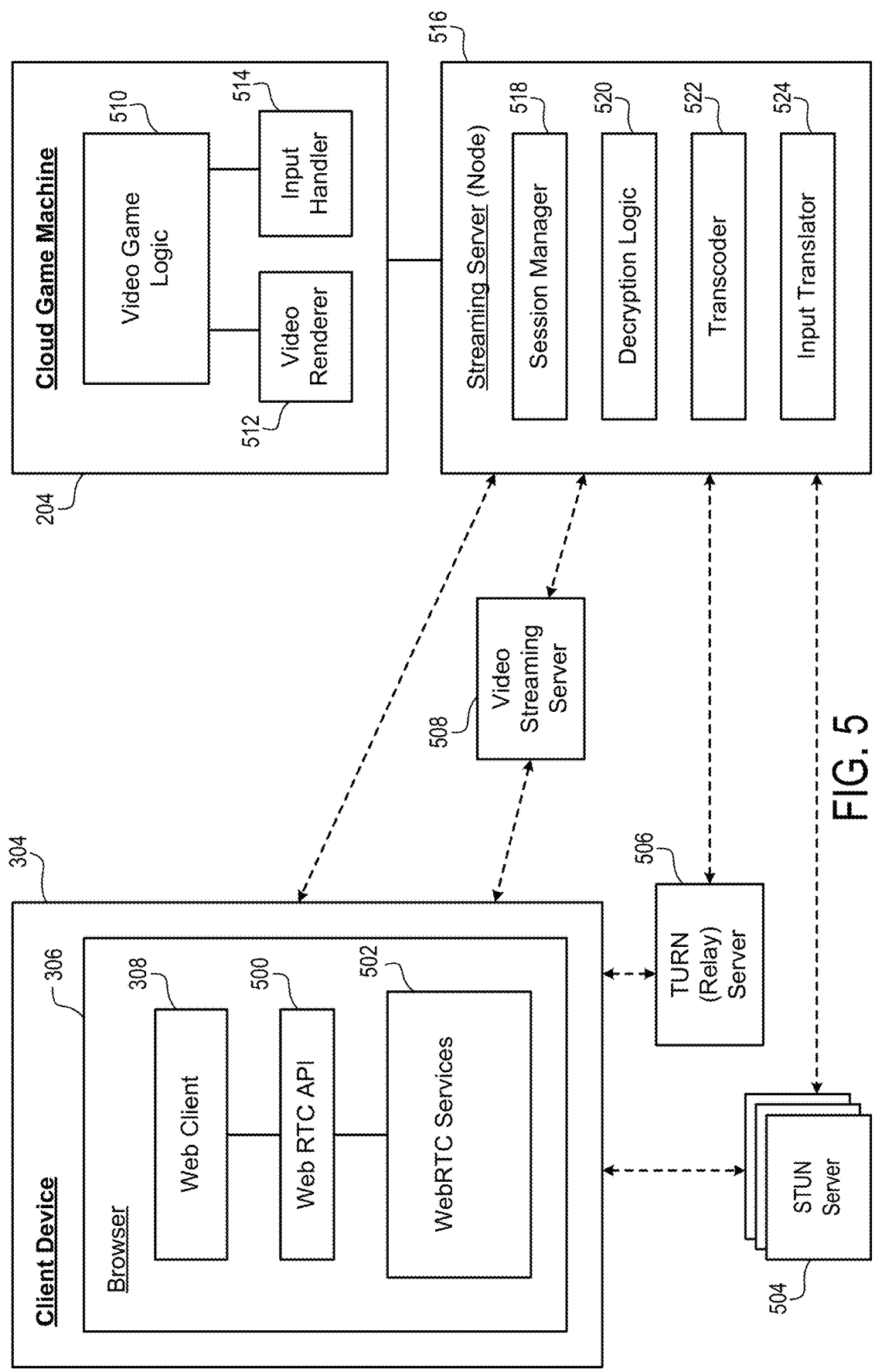
FIG. 5 illustrates a system for cloud gaming, illustrating components used to establish communication between a client device and a streaming server, in accordance with implementations of the disclosure.

FIG. 5 illustrates a system for cloud gaming, illustrating components used to establish communication between a client device and a streaming server, in accordance with implementations of the disclosure. To establish communication between the web client 308 that is executed by the browser 306 on the client device 304 and the streaming server 516, a signaling procedure is performed. During the signaling procedure, various information is exchanged, including session control messages to initialize or close communication and report errors, network configuration information (e.g. IP address and port), and media capabilities (e.g. codecs and resolutions handled by the browser).

In some implementations, signaling is performed using the RTCPeerConnection API and in accordance with Session Description Protocol (SDP) to define streaming initialization parameters. Furthermore, the Interactive Connectivity Establishment (ICE) framework can be utilized to facilitate exchange of network information and find the best network path between the client device 304 and the streaming serer 516. Broadly speaking, this may entail first attempting a connection using the host address obtained from the respective device's operating system and network card. If this fails (e.g. due to the device(s) employing network address translation (NAT)), then an external address is obtained using a STUN server 504, and if that fails, traffic is routed via a TURN relay server 506. In some implementations, the STUN server and TURN server can be the same server as a TURN server may include the functionality of a STUN server.

The web client 308 accesses a WebRTC API 500 to utilize various WebRTC Services 502 that handle streaming of data between the web client and the streaming server 516. For example, in some implementations, the video stream received by the web client is consumed using WebRTC protocols, e.g. using the RTCPeerConnection component and the underlying WebRTC protocols/codecs. The streaming server 516 can include a session manager 518 to handle the establishment of the session between the streaming server and the web client in accordance with the above-described signaling procedure.

The cloud game machine 204 executes the cloud video game and thereby defines video game logic 510. The video game logic 510 maintains a game state of the video game and continually updates the game state, using input from the user playing the video game when provided from the client. The cloud game machine 204 may include a video renderer 512 which generates the encrypted and encoded first video stream. The streaming server 516 (e.g. a node.js server) includes decryption logic 520 which is configured to decrypt the first video stream received from the cloud game machine 204. Optionally, a transcoder 522 may transcode the decrypted video stream from one encoding format to another encoding format, so as to optimize for the preferred encoding format for the specific type of the browser 306. Additional video processing can be performed, such as bitrate control and/or compression rate, color adjustment, audio processing, etc. As has been noted, the resulting encoded video content is transmitted over a secure protocol to the web client 308.

Furthermore, a data channel is established between the web client 308 and the streaming server 516, over which input data generated at the client device 304 is transmitted to the streaming server 516. This input data can be generated in response to interactive input received from an input device (e.g. input device 302) at the client device 304. In some implementations, the data channel is established using the RTCDataChannel API. The streaming server 516 includes an input translator 524 that is configured to translate the input data received over the data channel into one or more commands for the cloud game machine 204. The commands are transmitted to the cloud game machine 204, which may include an input handler 514 for processing the received commands and applying them to the video game logic 510.

As has been described in accordance with implementations previously discussed, a video stream is transmitted from the streaming server 516 to the client device 304 for handling by the web client 308 and rendering to a display. However, in some implementations, an additional video streaming server 508 (e.g. a VideoLAN streaming server) can be utilized to stream the video content to the client device 304. The additional video streaming server 508 may be configured to handle transcoding, bitrate control, or other processing of the video content so as to optimize the streaming performance for the client device and associated browser.

Figure 6:
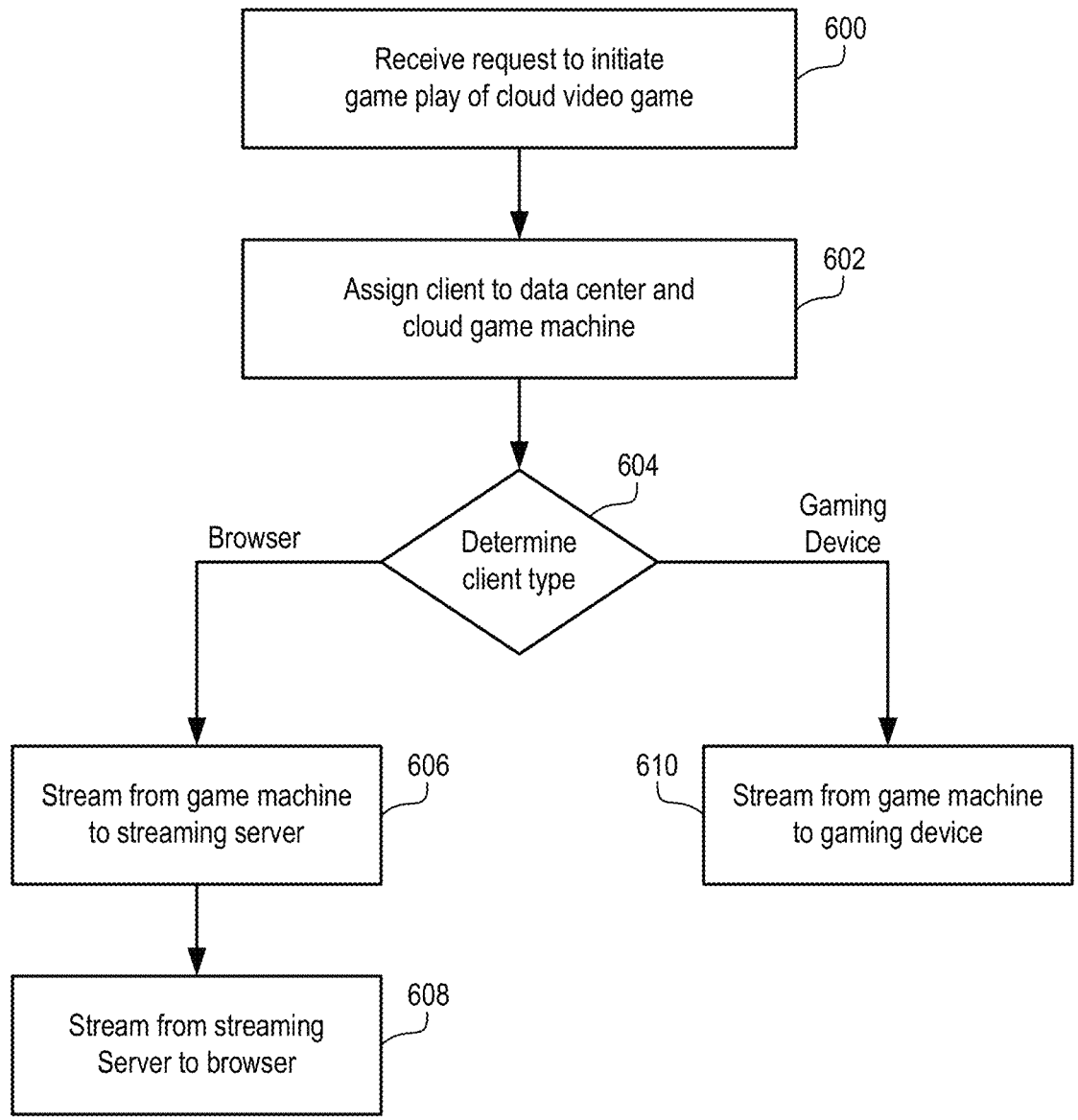
FIG. 6 illustrates a method for streaming gameplay of a cloud video game, in accordance with implementations of the disclosure.

FIG. 6 illustrates a method for streaming gameplay of a cloud video game, in accordance with implementations of the disclosure. At method operation 600, a request to initiate gameplay of a cloud video game is received over a network (e.g. including the Internet) by a cloud gaming system from a client. At method operation 602, the client is assigned to a data center, and furthermore assigned to a specific cloud game machine in the data center that is configured to execute the requested video game. At method operation 604, the type of the client is determined. If the client is a gaming device that is qualified to handle the video stream generated by the cloud game machine from execution of the video game, then at operation 610, the video stream from the cloud game machine is directly streamed to the client.

However, if the client is a browser executed on a client device (that has not been qualified in the same manner as the aforementioned gaming device client), then at operation 606 the video stream from the cloud game machine is transmitted to a streaming server which acts as a "client" with respect to the cloud game machine. The streaming server handles decryption of the video stream, and may further transcode or otherwise process the video stream. At operation 608, the streaming server then transmits a second video stream to the browser which is the client in this case.

The foregoing method thus provides for a cloud game machine to generate an encrypted video stream, and be utilized to service both qualified gaming devices and browser-based client devices.

Figure 7:
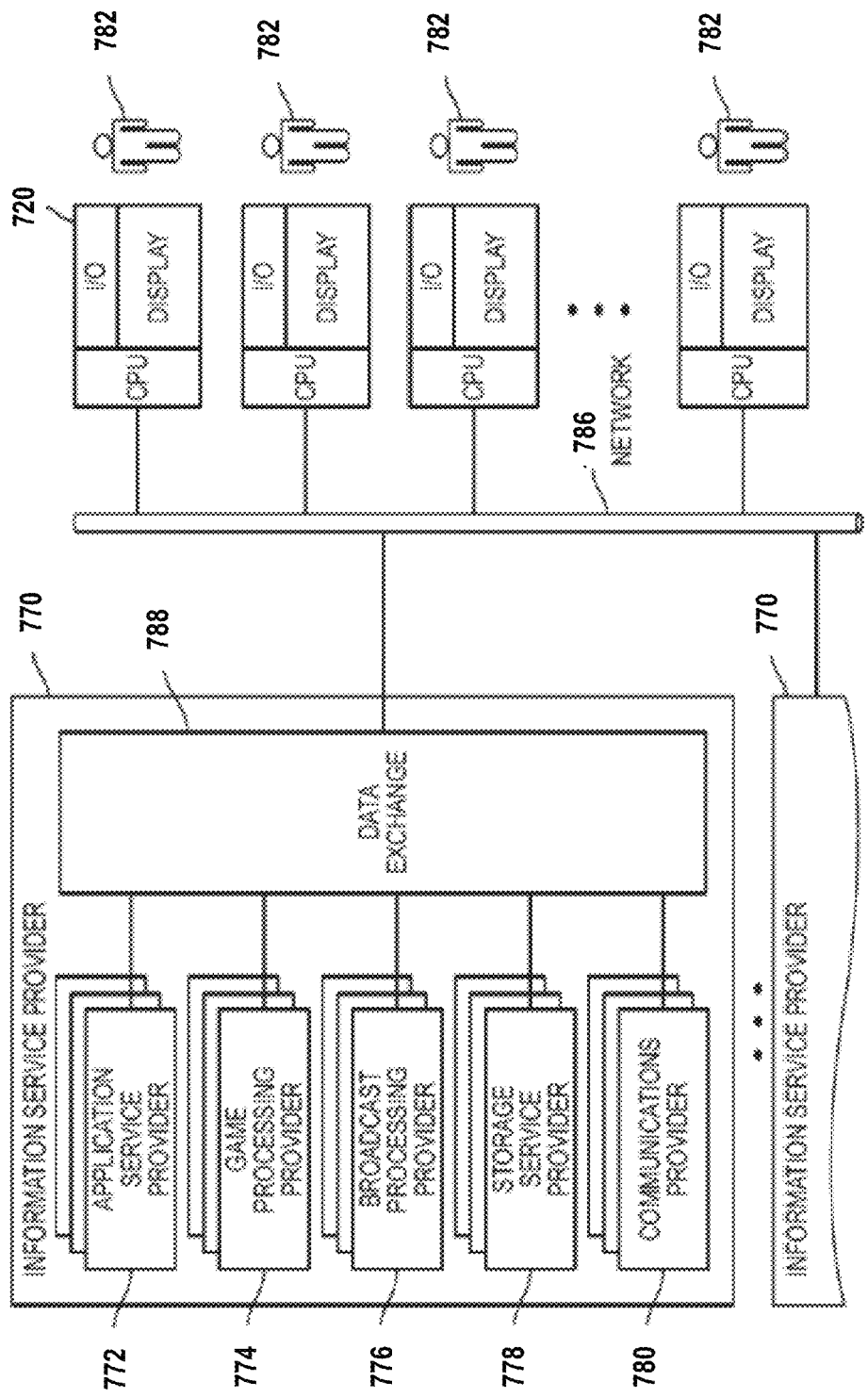
FIG. 7 illustrates an exemplary Information Service Provider architecture for delivering informational content and services to users who are geographically dispersed and connected via a network, in accordance with implementations of the disclosure.

FIG. 7 illustrates an embodiment of an Information Service Provider architecture. Information Service Providers (ISP) 770 delivers a multitude of information services to users 782 geographically dispersed and connected via network 786. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 770 includes Application Service Provider (ASP) 772, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 770 includes a Game Processing Server (GPS) 774 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 776 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 778 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 780 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 788 interconnects the several modules inside ISP 770 and connects these modules to users 782 via network 786. Data Exchange 788 can cover a small area where all the modules of ISP 770 are in close proximity, or can cover a large geographic area when the different modules are geographically dispersed. For example, Data Exchange 788 can include a fast Gigabit Ethernet (or faster) within a cabinet of a data center, or an intercontinental virtual area network (VLAN).

Users 782 access the remote services with client device 784, which includes at least a CPU, a memory, a display and I/O. The client device can be a PC, a mobile phone, a netbook, tablet, gaming system, a PDA, etc. In one embodiment, ISP 770 recognizes the type of device used by the client and adjusts the communication method employed. In other cases, client devices use a standard communications method, such as html, to access ISP 770.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

Figure 8:
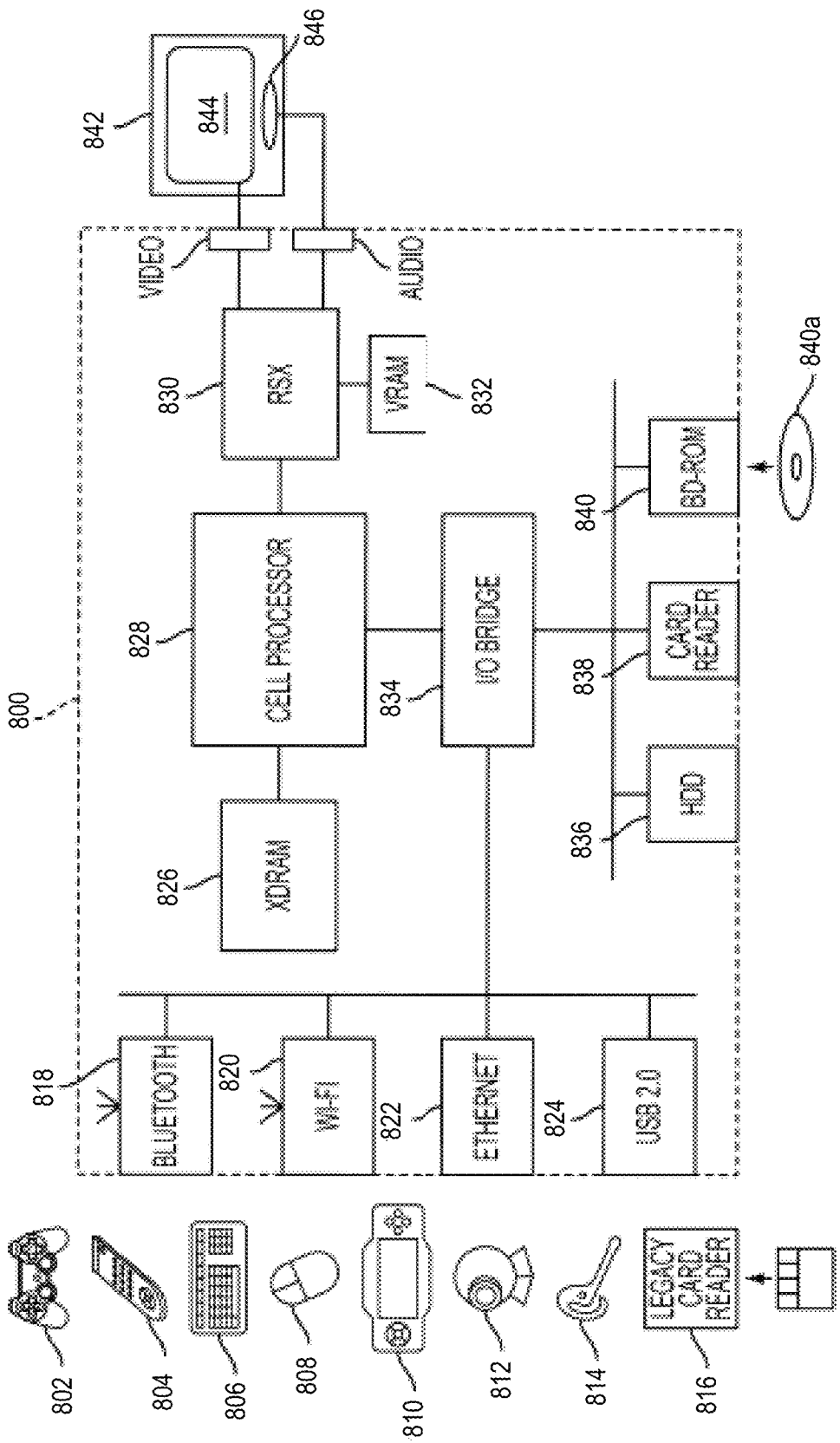
FIG. 8 illustrates exemplary components of a computing device used for controlling content presented to a user, in accordance with implementations of the disclosure.

FIG. 8 schematically illustrates the overall system architecture of a gaming console, such as Sony® Playstation 3® entertainment device, that may be compatible with controllers for implementing an avatar control system in accordance with one embodiment of the present disclosure. A system unit 800 is provided, with various peripheral devices connectable to the system unit 800. The system unit 800 can in some implementations be a computing server. The system unit 800 comprises: a Cell processor 828; a Rambus® dynamic random access memory (XDRAM) unit 826; a Reality Synthesizer graphics unit 830 with a dedicated video random access memory (VRAM) unit 832; and an I/O bridge 834. The system unit 800 also comprises a Blu Ray® Disk BD-ROM® optical disk reader 840 for reading from a disk 840*a* and a removable slot-in hard disk drive (HDD) 836, accessible through the I/O bridge 834. Optionally the system unit 800 also comprises a memory card reader 838 for reading compact flash memory cards, Memory Stick® memory cards and the like, which is similarly accessible through the I/O bridge 834.

The I/O bridge 834 also connects to six Universal Serial Bus (USB) 2.0 ports 824; a gigabit Ethernet port 822; an IEEE 802.11b/g wireless network (Wi-Fi) port 820; and a Bluetooth® wireless link port 818 capable of supporting of up to seven Bluetooth connections.

In operation the I/O bridge 834 handles all wireless, USB and Ethernet data, including data from one or more game controllers 802. For example when a user is playing a game, the I/O bridge 834 receives data from the game controller 802 via a Bluetooth link and directs it to the Cell processor 828, which updates the current state of the game accordingly.

The wireless, USB and Ethernet ports also provide connectivity for other peripheral devices in addition to game controllers 802, such as: a remote control 804; a keyboard 806; a mouse 808; a portable entertainment device 810 such as a Sony Playstation Portable® entertainment device; a video camera such as an EyeToy® video camera 812; and a microphone headset 814. Such peripheral devices may therefore in principle be connected to the system unit 800 wirelessly; for example the portable entertainment device 810 may communicate via a Wi-Fi ad-hoc connection, whilst the microphone headset 814 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 816 may be connected to the system unit via a USB port 824, enabling the reading of memory cards 848 of the kind used by the Playstation® or Playstation 2® devices.

In the present embodiment, the game controller 802 is operable to communicate wirelessly with the system unit 800 via the Bluetooth link. However, the game controller 802 can instead be connected to a USB port, thereby also providing power by which to charge the battery of the game controller 802. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 804 is also operable to communicate wirelessly with the system unit 800 via a Bluetooth link. The remote control 804 comprises controls suitable for the operation of the Blu Ray™ Disk BD-ROM reader 840 and for the navigation of disk content.

The Blu Ray™ Disk BD-ROM reader 840 is operable to read CD-ROMs compatible with the Playstation and PlayStation 2 devices, in addition to conventional pre-recorded and recordable CDs, and so-called Super Audio CDs. The reader 840 is also operable to read DVD-ROMs compatible with the Playstation 2 and PlayStation 3 devices, in addition to conventional pre-recorded and recordable DVDs. The reader 840 is further operable to read BD-ROMs compatible with the Playstation 3 device, as well as conventional pre-recorded and recordable Blu-Ray Disks.

The system unit 800 is operable to supply audio and video, either generated or decoded by the Playstation 3 device via the Reality Synthesizer graphics unit 830, through audio and video connectors to a display and sound output device 842 such as a monitor or television set having a display 844 and one or more loudspeakers 846. The audio connectors 850 may include conventional analogue and digital outputs whilst the video connectors 852 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 828. The Playstation 3 device's operating system supports Dolby® 5.1 surround sound, Dolby® Theatre Surround (DTS), and the decoding of 7.1 surround sound from Blu-Ray® disks.

In the present embodiment, the video camera 812 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 800. The camera LED indicator is arranged to illuminate in response to appropriate control data from the system unit 800, for example to signify adverse lighting conditions. Embodiments of the video camera 812 may variously connect to the system unit 800 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 800, an appropriate piece of software such as a device driver should be provided. Device driver technology is well-known and will not be described in detail here, except to say that the skilled man will be aware that a device driver or similar software interface may be required in the present embodiment described.

Figure 9:
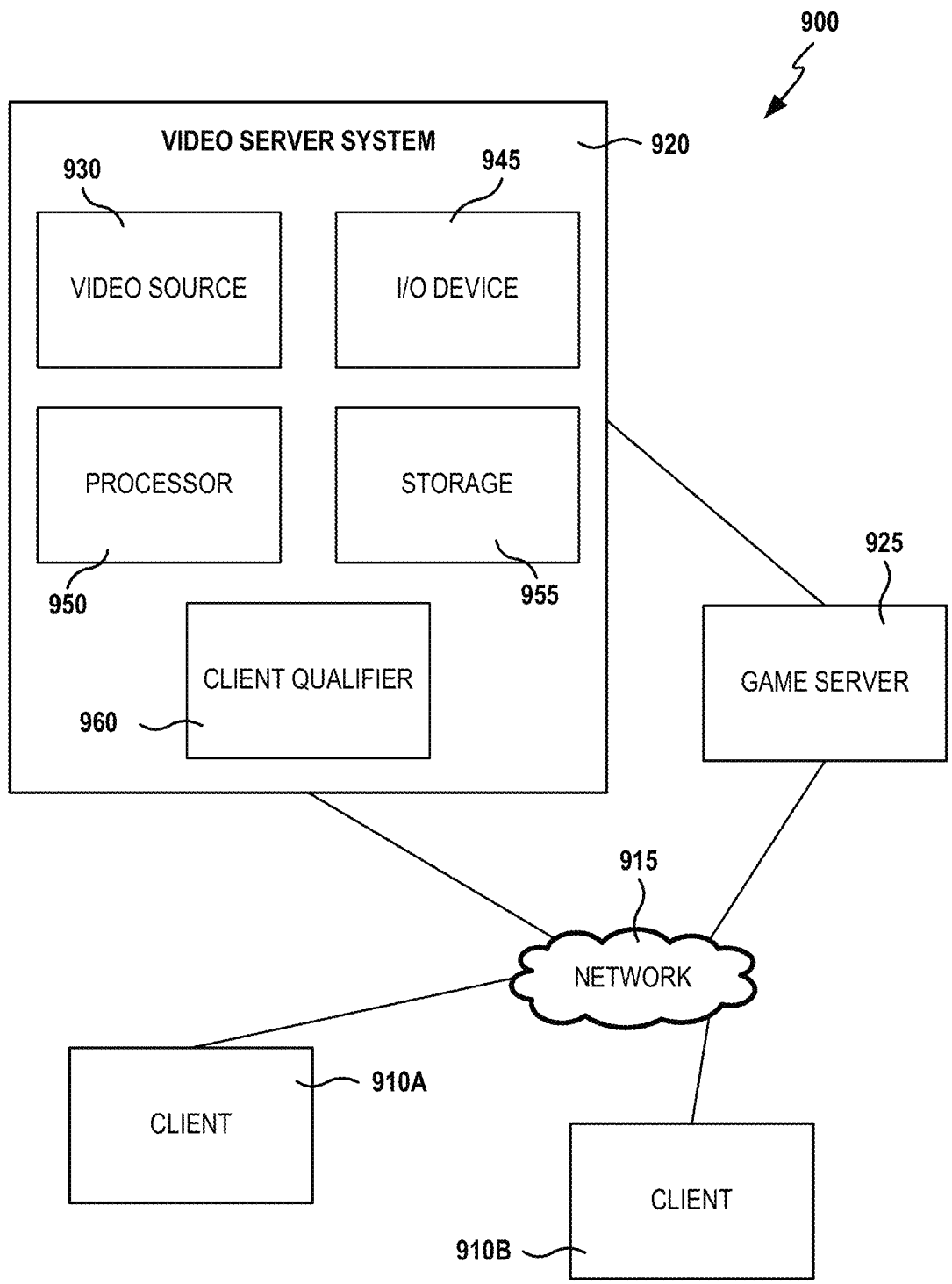
FIG. 9 is a block diagram of a Game System 900, in accordance with implementations of the disclosure.

FIG. 9 is a block diagram of a Game System 900, in accordance with implementations of the disclosure. Game System 900 is configured to provide a video stream to one or more Clients 910 via a Network 915. Game System 900 typically includes a Video Server System 920 and an optional game server 925. Video Server System 920 is configured to provide the video stream to the one or more Clients 910 with a minimal quality of service. For example, Video Server System 920 may receive a game command that changes the state of or a point of view within a video game, and provide Clients 910 with an updated video stream reflecting this change in state with minimal lag time. The Video Server System 920 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 920 frames per second. Although higher or lower frame rates are included in alternative embodiments of the disclosure.

Clients 910, referred to herein individually as 910A., 910B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 910 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 910 or on a separate device such as a monitor or television. Clients 910 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 910 are optionally geographically dispersed. The number of clients included in Game System 900 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 920 to deliver a game viewed through the HMD. In one embodiment, the game console receives the video stream from the video server system 920, and the game console forwards the video stream, or updates to the video stream, to the HMD for rendering.

Clients 910 are configured to receive video streams via Network 915. Network 915 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 910 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 910 may, but are not required to, further include systems configured for modifying received video. For example, a client may be configured to perform further rendering, to overlay one video image on another video image, to crop a video image, and/or the like. For example, Clients 910 may be configured to receive various types of video frames, such as I-frames, P-frames and B-frames, and to process these frames into images for display to a user. In some embodiments, a member of Clients 910 is configured to perform further rendering, shading, conversion to 3-D, or like operations on the video stream. A member of Clients 910 is optionally configured to receive more than one audio or video stream. Input devices of Clients 910 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 910 is generated and provided by Video Server System 920. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 910 are typically configured to receive inputs from a user. These inputs may include game commands configured to change the state of the video game or otherwise affect game play. The game commands can be received using input devices and/or may be automatically generated by computing instructions executing on Clients 910. The received game commands are communicated from Clients 910 via Network 915 to Video Server System 920 and/or Game Server 925. For example, in some embodiments, the game commands are communicated to Game Server 925 via Video Server System 920. In some embodiments, separate copies of the game commands are communicated from Clients 910 to Game Server 925 and Video Server System 920. The communication of game commands is optionally dependent on the identity of the command. Game commands are optionally communicated from Client 910A through a different route or communication channel that that used to provide audio or video streams to Client 910A.

Game Server 925 is optionally operated by a different entity than Video Server System 920. For example, Game Server 925 may be operated by the publisher of a multi-player game. In this example, Video Server System 920 is optionally viewed as a client by Game Server 925 and optionally configured to appear from the point of view of Game Server 925 to be a prior art client executing a prior art game engine. Communication between Video Server System 920 and Game Server 925 optionally occurs via Network 915. As such, Game Server 925 can be a prior art multiplayer game server that sends game state information to multiple clients, one of which is game server system 920. Video Server System 920 may be configured to communicate with multiple instances of Game Server 925 at the same time. For example, Video Server System 920 can be configured to provide a plurality of different video games to different users. Each of these different video games may be supported by a different Game Server 925 and/or published by different entities. In some embodiments, several geographically distributed instances of Video Server System 920 are configured to provide game video to a plurality of different users. Each of these instances of Video Server System 920 may be in communication with the same instance of Game Server 925. Communication between Video Server System 920 and one or more Game Server 925 optionally occurs via a dedicated communication channel. For example, Video Server System 920 may be connected to Game Server 925 via a high bandwidth channel that is dedicated to communication between these two systems.

Video Server System 920 comprises at least a Video Source 930, an I/O Device 945, a Processor 950, and non-transitory Storage 955. Video Server System 920 may include one computing device or be distributed among a plurality of computing devices. These computing devices are optionally connected via a communications system such as a local area network.

Video Source 930 is configured to provide a video stream, e.g., streaming video or a series of video frames that form a moving picture. In some embodiments, Video Source 930 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 925. Game Server 925 may maintain a copy of the state of the game based on game commands received from multiple players using geographically disperse clients. In these cases, the game state is provided by Game Server 925 to Video Source 930, wherein a copy of the game state is stored and rendering is performed. Game Server 925 may receive game commands directly from Clients 910 via Network 915, and/or may receive game commands via Video Server System 920.

Video Source 930 typically includes rendering logic, e.g., hardware, firmware, and/or software stored on a computer readable medium such as Storage 955. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 910. For example, the raw video may be encoded according to an Adobe Flash® standard, .wav, H.265, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 930 includes a video recording device such as a camera. This camera may be used to generate delayed or live video that can be included in the video stream of a computer game. The resulting video stream, optionally includes both rendered images and images recorded using a still or video camera. Video Source 930 may also include storage devices configured to store previously recorded video to be included in a video stream. Video Source 930 may also include motion or positioning sensing devices configured to detect motion or position of an object, e.g., person, and logic configured to determine a game state or produce video-based on the detected motion and/or position.

Video Source 930 is optionally configured to provide overlays configured to be placed on other video. For example, these overlays may include a command interface, log in instructions, messages to a game player, images of other game players, video feeds of other game players (e.g., webcam video). In embodiments of Client 910A including a touch screen interface or a gaze detection interface, the overlay may include a virtual keyboard, joystick, touch pad, and/or the like. In one example of an overlay a player's voice is overlaid on an audio stream. Video Source 930 optionally further includes one or more audio sources.

In embodiments wherein Video Server System 920 is configured to maintain the game state based on input from more than one player, each player may have a different point of view comprising a position and direction of view. Video Source 930 is optionally configured to provide a separate video stream for each player based on their point of view. Further, Video Source 930 may be configured to provide a different frame size, frame data size, and/or encoding to each of Client 910. Video Source 930 is optionally configured to provide 3-D video.

I/O Device 945 is configured for Video Server System 920 to send and/or receive information such as video, commands, requests for information, a game state, gaze information, device motion, device location, user motion, client identities, player identities, game commands, security information, audio, and/or the like. I/O Device 945 typically includes communication hardware such as a network card or modem. I/O Device 945 is configured to communicate with Game Server 925, Network 915, and/or Clients 910.

Processor 950 is configured to execute logic, e.g. software, included within the various components of Video Server System 920 discussed herein. For example, Processor 950 may be programmed with software instructions in order to perform the functions of Video Source 930, Game Server 925, and/or a Client Qualifier 960. Video Server System 920 optionally includes more than one instance of Processor 950. Processor 950 may also be programmed with software instructions in order to execute commands received by Video Server System 920, or to coordinate the operation of the various elements of Game System 900 discussed herein. Processor 950 may include one or more hardware device. Processor 950 is an electronic processor.

Storage 955 includes non-transitory analog and/or digital storage devices. For example, Storage 955 may include an analog storage device configured to store video frames. Storage 955 may include a computer readable digital storage, e.g. a hard drive, an optical drive, or solid state storage. Storage 915 is configured (e.g. by way of an appropriate data structure or file system) to store video frames, artificial frames, a video stream including both video frames and artificial frames, audio frame, an audio stream, and/or the like. Storage 955 is optionally distributed among a plurality of devices. In some embodiments, Storage 955 is configured to store the software components of Video Source 930 discussed elsewhere herein. These components may be stored in a format ready to be provisioned when needed.

Video Server System 920 optionally further comprises Client Qualifier 960. Client Qualifier 960 is configured for remotely determining the capabilities of a client, such as Clients 910A or 910B. These capabilities can include both the capabilities of Client 910A itself as well as the capabilities of one or more communication channels between Client 910A and Video Server System 920. For example, Client Qualifier 960 may be configured to test a communication channel through Network 915.

Client Qualifier 960 can determine (e.g., discover) the capabilities of Client 910A manually or automatically. Manual determination includes communicating with a user of Client 910A and asking the user to provide capabilities. For example, in some embodiments, Client Qualifier 960 is configured to display images, text, and/or the like within a browser of Client 910A. In one embodiment, Client 910A is an HMD that includes a browser. In another embodiment, client 910A is a game console having a browser, which may be displayed on the HMD. The displayed objects request that the user enter information such as operating system, processor, video decoder type, type of network connection, display resolution, etc. of Client 910A. The information entered by the user is communicated back to Client Qualifier 960.

Automatic determination may occur, for example, by execution of an agent on Client 910A and/or by sending test video to Client 910A. The agent may comprise computing instructions, such as java script, embedded in a web page or installed as an add-on. The agent is optionally provided by Client Qualifier 960. In various embodiments, the agent can find out processing power of Client 910A, decoding and display capabilities of Client 910A, lag time reliability and bandwidth of communication channels between Client 910A and Video Server System 920, a display type of Client 910A, firewalls present on Client 910A, hardware of Client 910A, software executing on Client 910A, registry entries within Client 910A, and/or the like.

Client Qualifier 960 includes hardware, firmware, and/or software stored on a computer readable medium. Client Qualifier 960 is optionally disposed on a computing device separate from one or more other elements of Video Server System 920. For example, in some embodiments, Client Qualifier 960 is configured to determine the characteristics of communication channels between Clients 910 and more than one instance of Video Server System 920. In these embodiments the information discovered by Client Qualifier can be used to determine which instance of Video Server System 920 is best suited for delivery of streaming video to one of Clients 910.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method for providing gameplay of a cloud video game, comprising:

executing a session of the cloud video game by a cloud gaming machine, wherein the cloud gaming machine includes game console hardware having standardized resources for the cloud video game, wherein executing the session generates a first gameplay video stream that is encrypted with a native encryption scheme of the game console hardware;

determining a type of a client that accesses the session over a network for gameplay;

responsive to determining the type of the client is a dedicated client device configured to handle decryption of the first gameplay video stream, then transmitting the first gameplay video stream over the network to the dedicated client device;

responsive to determining the type of the client is a client browser, then instantiating a streaming server, and receiving, by the streaming server from the cloud gaming machine, the first gameplay video stream generated from the executing session of the cloud video game, and decrypting the first gameplay video stream and using the decrypted first gameplay video stream to generate a second gameplay video stream that is encrypted with a non-native encryption scheme;

establishing, over the network, a connection between the streaming server and the remote client browser, the connection being established in accordance with a WebRTC protocol;

transmitting, over the connection from the streaming server to the client browser, the second gameplay video stream, wherein the second gameplay video stream is encoded in a compressed format, and wherein the second gameplay video stream is presented on a display by the client browser, wherein the streaming server is configured to receive non-native input data from the client browser and translate at least part of the received non-native input data into native commands configured to be native to the cloud video game, and the streaming server transmits said native commands to the cloud gaming machine, and the second gameplay video stream being rendered in substantial real-time to enable the real-time gameplay of the session of the cloud video game through the client browser;

wherein executing the session of the cloud video game includes applying the native commands to the session of the cloud video game, to drive the real-time gameplay of the session of the cloud video game through the client browser;

wherein the streaming server monitors a condition of the connection and adjusts the encoding of the second gameplay video stream based on the condition of the connection.

2. The method of claim 1, wherein the client browser accesses a WebRTC API to render the second gameplay video stream for display.

3. The method of claim 1, wherein establishing the connection is in accordance with Session Description Protocol.

4. The method of claim 1, wherein establishing the connection is in accordance with an Interactive Connectivity Establishment framework.

5. The method of claim 1, wherein the streaming server adjusts a bitrate or a compression rate of the second gameplay video stream based on the condition of the connection.

6. The method of claim 1, wherein the condition of the connection monitored by the streaming server includes a bandwidth of the connection.

7. The method of claim 1, wherein the second gameplay video stream is encoded in a VP9 or MPEG-4 video format.

8. The method of claim 1, wherein translating at least part of the received input data translates the input data that is received via the input mechanism into one or more console controller commands.

9. The method of claim 1, wherein establishing the connection is configured to reduce or eliminate intermediary connections.

10. The method of claim 1, further comprising:
assigning the client browser to a data center based on a location of the client browser and a location of the data center, the data center hosting the cloud gaming machine and the streaming server, the assigning of the client browser to the data center being configured to reduce latency over the connection.

11. The method of claim 1, wherein the cloud gaming machine is a game console or game console hardware board.

12. A client device comprising at least one processor configured to perform a method for providing gameplay of a cloud video game, said method including the following operations:

establishing, over a network, a connection between a streaming server and the client device, the connection being established in accordance with a WebRTC protocol, wherein the streaming server receives, from a cloud gaming machine, a first gameplay video stream generated from a session of the cloud video game executed by the cloud gaming machine, and wherein the cloud gaming machine includes game console hardware having standardized resources for the cloud video game, the first gameplay video stream being encrypted with a native encryption scheme of the game console hardware, and wherein the streaming server decrypts the first gameplay video stream and uses the decrypted first gameplay video stream to generate a second gameplay video stream that is encrypted with a non-native encryption scheme;

receiving, by the client device over the connection from the streaming server, the second gameplay video stream, wherein the second gameplay video stream is encoded in a compressed format, and presenting the second gameplay video stream on a display by the client device;

transmitting non-native input data to the streaming server from the client device, wherein the streaming server is configured to translate at least part of the received non-native input data into native commands configured to be native to the cloud video game, and the streaming server transmits said native commands to the cloud gaming machine, and the second gameplay video stream being rendered in substantial real-time to enable the real-time gameplay of the session of the cloud video game through the client device;

wherein executing the session of the cloud video game includes applying the native commands to the session of the cloud video game, to drive the real-time gameplay of the session of the cloud video game through the client device;

wherein the streaming server monitors a condition of the connection and adjusts the encoding of the second gameplay video stream based on the condition of the connection.

13. The client device of claim 12, wherein the client device accesses a WebRTC API to render the second gameplay video stream for display.

14. The client device of claim 12, wherein establishing the connection is in accordance with Session Description Protocol.

15. The client device of claim 12, wherein establishing the connection is in accordance with an Interactive Connectivity Establishment framework.

16. The client device of claim 12, wherein the streaming server adjusts a bitrate or a compression rate of the second gameplay video stream based on the condition of the connection.

17. The client device of claim 12, wherein the condition of the connection monitored by the streaming server includes a bandwidth of the connection.

18. The client device of claim 12, wherein the second gameplay video stream is encoded in a VP9 or MPEG-4 video format.

19. The client device of claim 12, wherein the method further includes:
   assigning the client device to a data center based on a location of the client device and a location of the data center, the data center hosting the cloud gaming machine and the streaming server, the assigning of the client device to the data center being configured to reduce latency over the connection.

20. The client device of claim 12, wherein the client device is a streaming media device.

* * * * *